W. E. DAVIS.

SMOKING PIPE.

APPLICATION FILED DEC. 23, 1913.

Reissued Nov. 17, 1914. 13,827.

Inventor

William E. Davis

By David V. Davis

Attorneys

Witnesses

Chas. L. Griesbauer.

Lillie E. Herrus.

UNITED STATES PATENT OFFICE.

WILLIAM E. DAVIS, OF NEW IPSWICH, NEW HAMPSHIRE.

SMOKING-PIPE.

13,827. Specification of Reissued Letters Patent. Reissued Nov. 17, 1914.

Original No. 1,059,956, dated April 22, 1913, Serial No. 687,732. Application for reissue filed December 23, 1913. Serial No. 808,393.

*To all whom it may concern:*

Be it known that I, WILLIAM E. DAVIS, a citizen of the United States, and a resident of New Ipswich, county of Hillsboro, State of New Hampshire, have invented certain new and useful Improvements in Smoking-Pipes, of which the following is a full and clear specification, reference being had to the accompanying drawings, in which—

Figure 1:
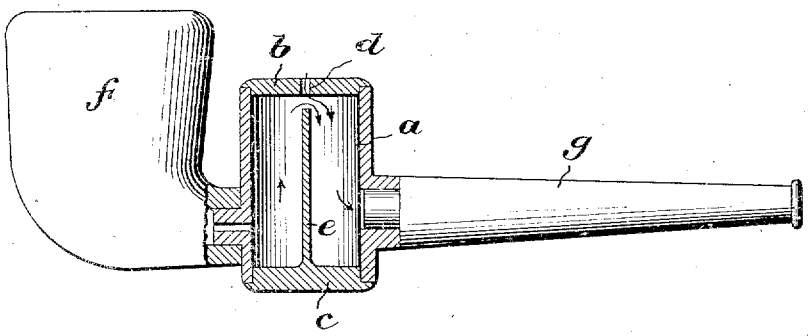
Figure 2:
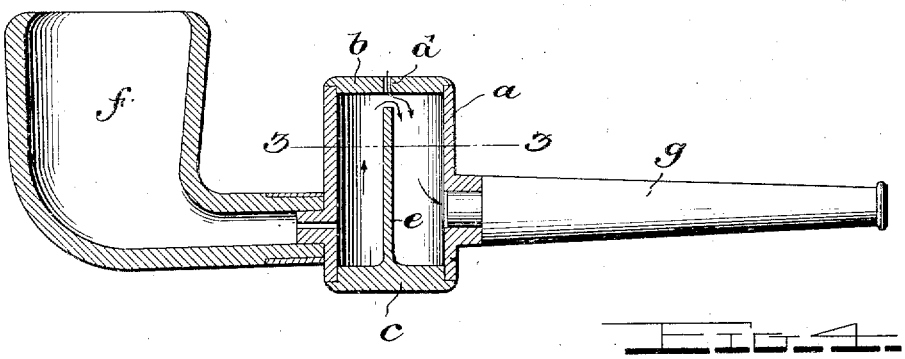
Figure 3:
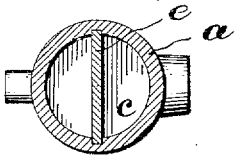
Figure 4:
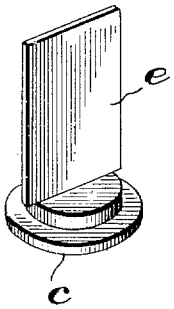

Figure 1 is a vertical sectional view showing my improvement applied to a pipe especially designed for it; Fig. 2 a similar view showing the invention applied as a detachable device to a pipe of well known construction; and Fig. 3 a vertical sectional view on the line 3—3 of Fig. 1. Fig. 4 is a detail view of the stopper and partition plate.

The object of this invention is to interpose between the mouth piece and the tobacco holding member (whether said member be a pipe bowl, cigarette holder or cigar holder) a simply-constructed and easily-cleaned chamber or cavity which will not only trap the pipe filth but will also serve to cool and dry the smoke, whereby the smoker shall receive into his mouth nothing but pure cool and dry smoke, as more fully hereinafter set forth.

Referring to the drawing by reference characters, *a* designates a vertical tubular chamber closed at its upper end by any suitable removable cap plate *b* and at its lower end by suitable removable cap or stopper *c*, the interior wall of said chamber being smooth and free of obstruction. In the top cover or cap plate *b* is an air inlet hole *d*, and mounted within the chamber *a* is a vertical plate *e* extending across the chamber and having its edges sliding in shallow grooves formed in the wall of the chamber at opposite sides thereof. This plate *e* forms a partition and is adapted to be removed from the chamber by being slid endwisely out one end thereof. This partition is preferably attached to the lower cover *c* so as to be removable therewith. The upper end of the partition terminates just short of the top cap *b*.

At one side of the partition *e*, the trap chamber *a* is connected in any suitable manner to the pipe bowl or other tobacco holding member *f*, and at the opposite side of the partition the chamber is connected in any suitable manner with the mouth piece *g*, both these connections being at a point above the bottom cap *c*. In Fig. 1 this trap chamber is shown attached to a pipe especially made for it while in Fig. 2 it is shown removably interposed between an ordinary pipe bowl and an ordinary mouth piece, this latter construction being desirable in that it enables my invention to be applied to pipes already on the market. It will be observed that as the smoke enters the trap chamber it will be drawn upwardly and over the top of the partition and then downwardly to the exit leading into the mouth piece. As the smoke passes over the top of the partition it draws into the trap chamber a small quantity of air through the hole *d*, this injection of air into the stream of smoke serves to cool the same as well as to condense the moisture therein and cause the same to be deposited on the walls of the trap chamber and the partition. Any moisture or pipe filth drawn into the chamber from the tobacco holding member will be caught in the trap chamber and thus prevent it from being drawn into the mouth piece. From time to time the end covers *b* and *c* may be removed for the purpose of cleaning off the partition *e* as well as the inner faces of the end covers. By arranging the trap chamber transversely with respect to the pipe stem and having its end covers removable and its interior substantially without obstructions, I provide for a ready and complete cleaning out of the chamber.

A feature of value in my device is the provision of a vertical partition to divide the trap chamber into two compartments and so arranging the partition that the smoke must take a circuitous route while passing through the trap device, whereby condensation and deposition of the moisture will be greatly facilitated, it being desirable to take out of the smoke as much of the moisture as possible before it enters the mouth of the smoker, as it is the moisture that carries the undesirable parts of the products of combustion of the tobacco. It is preferred that the partition shall extend to a point near the top cap of the chamber so that in passing through the chamber the smoke shall be compelled to pass upwardly over the partition. To still further insure the condensation of the moisture, the air inlet is arranged so that the air shall be drawn into the stream of smoke just where it is concentrated in passing over the partition, to the end that the air shall be intimately mingled with the smoke at a point somewhat remote from the entrance into the mouth-piece, so that the condensed moisture shall be deposited within the trap chamber before it is drawn into the mouthpiece.

Another feature lies in locating the air intake at the center of the cover, so that in replacing the cover the air intake shall always be located at the most desirable point, irrespective of care in replacing the cover.

A further feature of importance is the locating of the air inlet at a point above the well in which the pipe tarry products of combustion collect by gravity; that is to say, at a point above the upper surface of the bottom cover, so that unless the pipe is held in an abnormal position, danger of the pipe filth escaping out through the opening is impossible.

Having thus described my invention, what I claim as new and desire to secure by Letters Patent, is—

1. In a smoking appliance, the combination of a tobacco holding member, a mouth piece, a trap chamber interposed between the mouth piece and said member, said chamber being provided with removable end covers and with an interior vertical partition, this partition being also removable and the top cover being provided with an air inlet, substantially as and for the purpose set forth.

2. In a tobacco smoking appliance, the combination of a tobacco holding member, a mouth piece, a trap chamber interposed between the mouth piece and said member, said chamber being provided with removable top and bottom covers, the top cover being provided with a central air inlet, and a vertical partition attached to the bottom cover, so as to be removable therewith, and extending to near the top cover.

3. In a tobacco smoking appliance, the combination of a tobacco holding member, a mouth piece, a trap chamber interposed between said mouth piece and said member, said trap chamber being provided with a vertical partition dividing its interior into two compartments, top and bottom closures one of which is removable, the upper one of said closures being provided with an air inlet.

In testimony whereof I hereunto affix my signature in the presence of two witnesses.

WILLIAM E. DAVIS.

Witnesses:

CARRIE LYMAN,

JOHN F. MCCUDDY.